(12) United States Patent
Ng et al.

(10) Patent No.: US 7,778,500 B2
(45) Date of Patent: Aug. 17, 2010

(54) OPTICAL FIBER STRAIN SENSOR

(75) Inventors: Jun Hong Ng, Singapore (SG); Xiaoqun Zhou, Singapore (SG)

(73) Assignee: Agency For Science, Technology and Research, Centros (SG)

( * ) Notice: Subject to any disclaimer, the term of this patent is extended or adjusted under 35 U.S.C. 154(b) by 0 days.

(21) Appl. No.: 11/910,608

(22) PCT Filed: Apr. 5, 2006

(86) PCT No.: PCT/SG2006/000085
§ 371 (c)(1),
(2), (4) Date: Jun. 3, 2008

(87) PCT Pub. No.: WO2006/107277
PCT Pub. Date: Oct. 12, 2006

(65) Prior Publication Data
US 2009/0092352 A1    Apr. 9, 2009

Related U.S. Application Data

(60) Provisional application No. 60/668,466, filed on Apr. 5, 2005.

(51) Int. Cl.
*G02B 6/00* (2006.01)
*G02B 6/34* (2006.01)
(52) U.S. Cl. .......................... 385/13; 385/37
(58) Field of Classification Search .............. 385/13, 385/37
See application file for complete search history.

(56) References Cited

U.S. PATENT DOCUMENTS

| | | |
|---|---|---|
| 6,768,098 B1 | 7/2004 | Sugden et al. |
| 7,027,672 B2 | 4/2006 | Tjin |
| 2003/0118266 A1* | 6/2003 | Kopp et al. ............. 385/12 |
| 2005/0163414 A1* | 7/2005 | Takeya et al. ............ 385/12 |

(Continued)

FOREIGN PATENT DOCUMENTS

GB    2346965 A    8/2000

(Continued)

OTHER PUBLICATIONS

Kersey, et al., "Fiber Grating Sensors," Journal of Lightwave Technology, Aug. 1997, pp. 1442-1463, vol. 15.

(Continued)

*Primary Examiner*—Charlie Peng
*Assistant Examiner*—Jerry Blevins
(74) *Attorney, Agent, or Firm*—McDermott Will & Emery LLP

(57) ABSTRACT

An optical fiber strain sensor, a method of fabricating the same, and a method of sensing strain. The method of strain sensing comprises providing an optical fiber having a fiber Bragg grating (FBG) formed therein; subjecting the optical fiber to a strain inducing force such that a grating period in a first portion of the FBG compresses and a grating period in a second portion of the FBG extends; and optically interrogating the FBG to determine a measure of a change in bandwidth of the FBG as a result of the compression and extension of the grating periods in the first and second portion respectively; whereby the measure of the change in the bandwidth is representative of the strain induced.

24 Claims, 6 Drawing Sheets

U.S. PATENT DOCUMENTS

2007/0280583 A1 12/2007 Tjin

FOREIGN PATENT DOCUMENTS

| JP | 2000-329627 | | 11/2000 | |
|---|---|---|---|---|
| WO | WO 02/46712 A1 | | 6/2002 | |
| WO | WO 03/001262 A1 | | 1/2003 | |
| WO | WO 03001262 A1 | * | 1/2003 | ............ 385/37 |
| WO | WO 2004/104539 A1 | | 12/2004 | |

OTHER PUBLICATIONS

Xu, et al., "Discrimination Between Strain and Temperature Effects Using Dual-Wavelength Fibre Grating Sensors," Electronics Letters, Jun. 23, 1994, pp. 1085-1087, Vo. 30, No. 13.

Xu, et al., "Thermally-Compensated Bending Gauge Using Surface-Mounted Fibre Gratings," International Journal of Optoelectronics, 1994, pp. 281-283, vol. 9, No. 3.

James, et al., "Simultaneous Independent Temperature and Strain Measurement Using In-Fibre Bragg Grating Sensors," Electronics Letters, Jun. 6, 1996, pp. 1133-1134, vol. 32, No. 12.

* cited by examiner

OPTICAL FIBER STRAIN SENSOR

CROSS-REFERENCE TO RELATED APPLICATIONS

This application is a National Stage application of International Application No. PCT/SG2006/000085, with an international filing date of Apr. 5, 2006, and also claims the benefit of provisional application 60/668,466 filed Apr. 5, 2005.

FIELD OF INVENTION

The present invention relates broadly to an optical fiber strain sensor, a method of fabricating the same, and a method of sensing strain.

BACKGROUND

Fiber Bragg Grating (FBG) sensors have been used in temperature and strain sensor applications [A. D. Kersey, M. A. Davis, H. J. Patrick, M. LeBlanc, K. P. Koo, C, G. Askins, M. A. Putnam, and E. J. Friebele, "Fiber grating sensors," *J. Lightwave Technol.*, vol. 15, pp. 1442-1462, August 1997]. One problem of FBG sensors is the discrimination of temperature and strain responses. For strain sensor applications, the wavelength shift of the FBG due to the applied strain should be measured, but the shift is also induced by environmental temperature perturbations. Therefore, it is necessary to subtract the temperature effect from the wavelength shift so that one can obtain the strain effect only.

A number of techniques for overcoming this limitation have been reported and demonstrated. For example, the dual wavelength technique involves writing two superimposed FBGs with large Bragg centre wavelength separation (850-1300 nm), which requires two broadband sources to address the sensors [M. G. Xu, J. L. Archambault, L. Reekie, and J. P. Dakin, "Discrimination between strain and temperature effects using dual-wavelength fiber grating sensors," *Electron. Lett.*, vol. 30, no. 13, pp. 1085-1087, 1994].

Cancellation of the thermal response of the gratings has been reported using two FBGs that are mounted on opposite sides of a bend surface, such that the gratings have equal, but opposite strain [M. G. Xu, J. L. Archambault, L. Reekie, and J. P. Dakin, "Thermally compensated bending gauge using surface mounted fiber gratings," *Int. J. Optoelectron*, 9, pp. 281-283, 1994]. Light from a narrow bandwidth light source is split via a fiber coupler to the two FBGs mounted on opposite sides of the cantilever beam, and the light reflected from the respective FBGs is monitored utilizing an optical spectrum analyzer, for determining the difference in Bragg wavelength of the two FBGs for thermally-independent strain measurements.

Another example is a two grating sensor with different fiber diameters, which have the same temperature property, to discriminate temperature and strain induced wavelength shift [S. W. James, M. L. Dockney, and R. P. Tatam, "Simultaneous independent temperature and strain measurement using in-fiber Bragg grating sensors," *Electron. Lett.*, vol. 32, no. 12, pp. 1133-1134, 1996].

The above described sensors can discriminate the two effects, but their structures are complex. Some of the sensors need sophisticated equipment such as spectrum analyzers to detect wavelength changes or demodulators in order to convert the wavelength changes to power or current changes. These devices are usually expensive and the measurement speeds of these devices are usually limited by e.g. the scanning speed of tunable filters or tunable lasers. Commercially available Fabry-Perot (FP) filters or tunable lasers can only scan up to a maximum of 1 kHz may limit their application in high speed strain monitoring, e.g. blast induced strain monitoring cohere the frequency response may be up to MHz range.

A need therefore exists to provide an alternative technique to address at least one of the above mentioned problems.

SUMMARY

In accordance with a first aspect of the present invention, there is provided a method of strain sensing comprising the steps of providing an optical fiber having a fiber Bragg grating (FBG) formed therein; subjecting the optical fiber to a strain inducing force such that a grating period in a first portion of the FBG compresses and a grating period in a second portion of the FBG extends; and optically interrogating the FBG to determine a measure of a change in bandwidth of the FBG as a result of the compression and extension of the grating periods in the first and second portion respectively; whereby the measure of the change in the bandwidth is representative of the strain induced.

The FBG, in a quiescent state, may have a uniform period across the first and second portions.

The optical fiber may be subjected to the strain inducing force such that a grating period in a third portion of the FBG remains unchanged.

The method may comprise providing an optical fiber having a plurality of FBGs formed therein and spaced apart along a length of the optical fiber; subjecting the optical fiber to a plurality of strain inducing forces such that, for each FBG, a grating period in a first portion of the FBG compresses and a grating period in a second portion of the FBG extends; and optically interrogating the FBGs to determine a measure of changes in bandwidth of the respective FBGs as a result of the compression and extension of the grating periods in the first and second portion respectively; whereby the measure of the changes in the bandwidth is representative of the strains induced.

The method may comprise measuring a reflected optical power from the FBG as the measure for the change in the bandwidth.

In accordance with a second aspect of the present invention, there is provided an optical fiber strain sensor comprising an optical fiber; an FBG formed in the optical fiber; a packaging structure embedding the optical fiber such that, if the optical fiber is subjected to a strain inducing force, a grating period in a first portion of the FBG compresses and a grating period in a second portion of the FBG extends; and an interrogation system coupled to the optical fiber for optically interrogating the FBG to determine a measure of a change in bandwidth of the FBG as a result of the compression and extension of the grating periods in the first and second portion respectively; whereby the measure of the change in the bandwidth is representative of the strain induced.

The FBG, in a quiescent state, may have a uniform period across the first and second portions.

The packaging structure may embed the optical fiber such that, if the optical fiber is subjected to the strain inducing force, a grating period in a third portion of the FBG remains unchanged.

The packaging structure may comprise a composite laminate structure.

The composite laminate structure may comprise fiber-reinforced carbon composite material prepregs.

The composite laminate structure may be asymmetric with respect to the FBG.

The optical fiber may have a plurality of FBGs formed therein and spaced apart along a length of the optical fiber; and the packaging structure embeds the optical fiber such that, if the optical fiber is subjected to a plurality of strain inducing forces, for each FBG a grating period in a first portion of the FBG compresses and a grating period in a second portion of the FBG extends; and the interrogating system optically interrogates the FBGs to determine a measure of changes in bandwidth of the respective FBGs as a result of the compression and extension of the grating periods in the first and second portion respectively; whereby the measure of the changes in the bandwidth is representative of the strains induced.

The sensor may further comprise a photo detector for measuring a reflected optical power from the FGB as the measure for the change in the bandwidth.

In accordance with a third aspect of the present invention, there is provided a method of fabricating an optical fiber strain sensor, the method comprising the steps of providing an optical fiber; forming an FBG formed in the optical fiber; embedding the optical fiber in a packaging structure such that, if the optical fiber is subjected to a strain inducing force, a grating period in a first portion of the FBG compresses and a grating period in a second portion of the FBG extends.

The method may further comprise coupling an interrogation system to the optical fiber for optically interrogating the FBG to determine a measure of a change in bandwidth of the FBG as a result of the compression and extension of the grating periods in the first and second portion respectively; whereby the measure of the change in the bandwidth is representative of the strain induced.

The FBG, in a quiescent state, may have a uniform period across the first and second portions.

The packaging structure may embed the optical fiber such that, if the optical fiber is subjected to the strain inducing force, a grating period in a third portion of the FBG remains unchanged.

The packaging structure may comprise a composite laminate structure.

The composite laminate structure may comprise fiber-reinforced carbon composite material prepregs.

The composite laminate structure may be asymmetric with respect to the FBG.

The method may comprise forming a plurality of FBGs in the optical fiber and spaced apart along a length of the optical fiber; and embedding portions of the optical fiber in respective packaging structures such that, if the optical fiber is subjected to a plurality of strain inducing forces, for each FBG a grating period in a first portion of the FBG compresses and a grating period in a second portion of the FBG extends.

The interrogating system may optically interrogate the FBGs to determine a measure of changes in bandwidth of the respective FBGs as a result of the compression and extension of the grating periods in the first and second portion respectively; whereby the measure of the changes in the bandwidth is representative of the strains induced.

The interrogation system may comprise a photo detector for measuring a reflected optical power from the FBG as the measure for the change in the bandwidth.

DETAILED DESCRIPTION

An FBG sensor module is disclosed that can translate strain into the variation of the FBG bandwidth. The sensor includes a uniform FBG with three sections that are embedded into an asymmetric reinforced composite laminate. If e.g. a downward force is applied to an upper layer of the composite laminate, an FBG section in a first portion of the asymmetric composite laminate compresses and that FBG section's wavelength shifts to a shorter wavelength. An FBG section in a second portion of the asymmetric composite laminate expands and that FBG section's wavelength shifts to a longer wavelength. An FBG section in a neutral layer of the asymmetric composite laminate remains unchanged, i.e. that FBG section's wavelength also remains unchanged.

As the applied strain increases, the bandwidth of the reflection spectrum of the uniform FBG thus increases, and hence the reflected power for the grating also increases.

For temperature perturbations, however, the reflection bandwidth does not change, since the uniform FBG will "react" in a uniform way to the temperature perturbations, as those perturbations are substantially independent from the asymmetric composite laminate into which the uniform FBG is embedded. Thus, the wavelength and reflection band of the uniform FBG moves "as a whole", and hence the reflected power is maintained. Thus, the strain measurement simply involves monitoring the back-reflected power from the FBG.

The measurement speed is substantially only limited by the speed of the detector, e.g. a photodiode (PD), with speeds that can currently be as fast as a few GHz.

To achieve simultaneous multi-sensor measurement, a bandpass wavelength division multiplexer (BWDM) can be used to separate the reflected power from an array of such uniform gratings, each embedded into an asymmetric reinforced composite laminate, with different centre wavelength.

Figure 1:
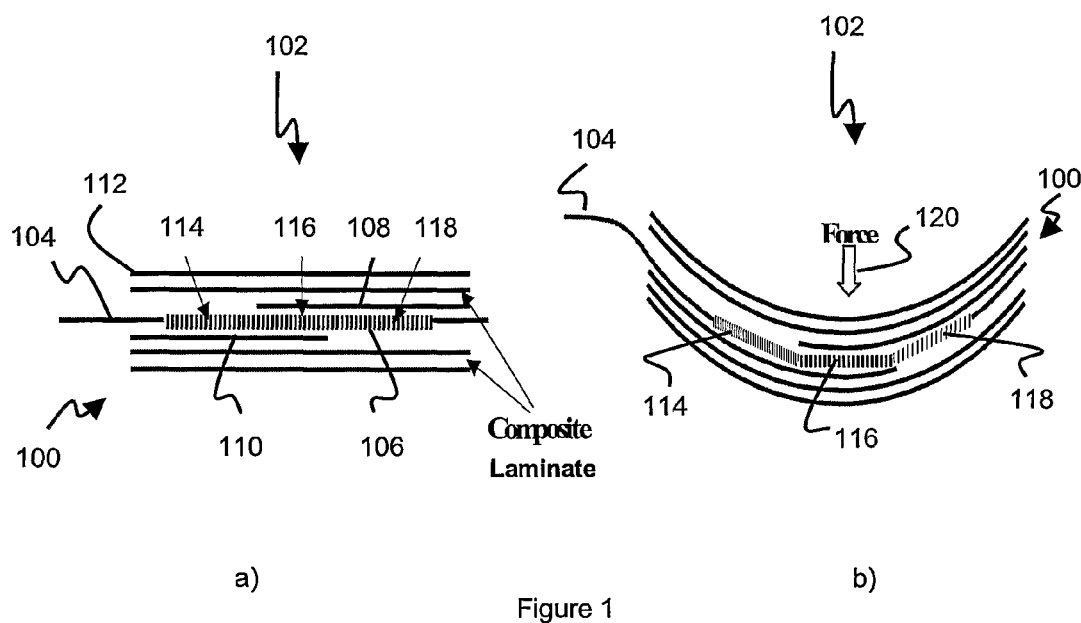
FIGS. 1a and b show schematic cross-sectional views of an optical fiber strain sensor.

FIG. 1a shows a schematic diagram of an asymmetric composite laminate structure 100 of the sensor module 102. The laminate structure 100 comprises an optical fiber with a uniform FBG 106 written into the core of the fiber 104. The fiber 104 is embedded within the composite laminate structure 100 such that fiber-reinforced material layers 108, 110 adjacent above and below the optical fiber 104 respectively are arranged asymmetrically. More particular, the material layers 108, 110 are disposed at opposite ends along the grating 106, with an overlap area between the material layers 108, 110 around the centre of the FBG 106. The material layers 108, 110 are in turn embedded between further fiber-reinforced material layers e.g. 112 which extend along the entire length of the uniform FBG 106.

The uniform FBG 106 is thus "divided" into three sections 114, 116, and 118. With reference to FIG. 1b, if a force 120 is applied as shown, as a result of the asymmetric composite laminate structure 100, section 114 of the FBG 106 compresses, section 116 of FBG 106 remains unchanged, whereas section 118 of the FBG 106 expands, as described above.

Figure 2:
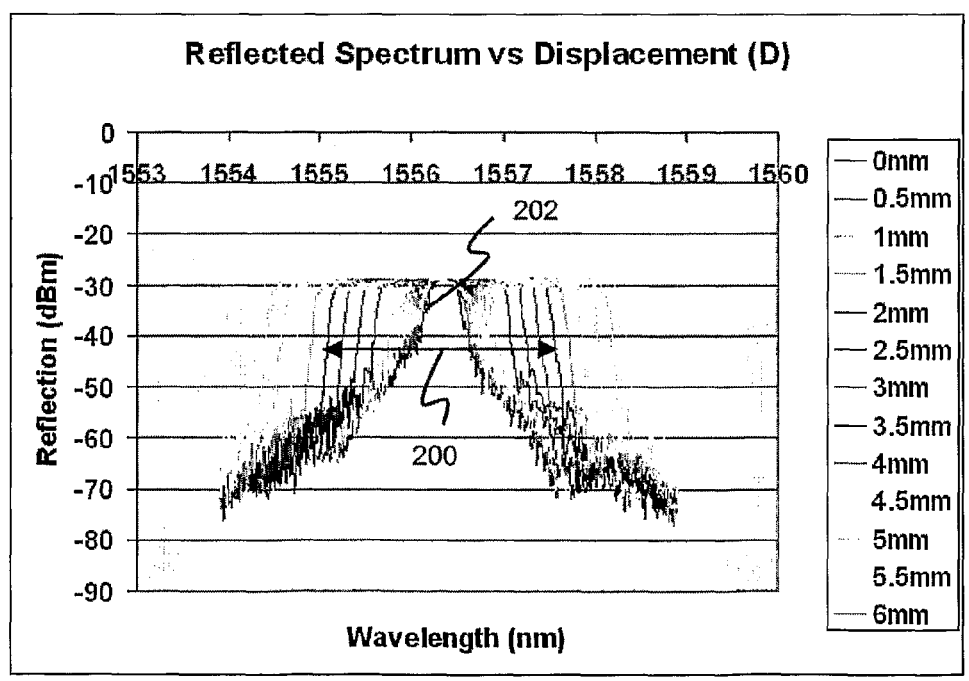
FIG. 2 shows a graph of reflection spectra of the optical fiber strain sensor of FIGS. 1a and b for different displacements.

FIG. 2 shows the reflected spectrum versus displacement as a result of the force 120 (FIG. 1b) being applied. As can be seen from FIG. 2, the Bandwidth e.g. 200 is getting larger with increasing displacement, while the centre wavelength remains unchanged when the force is applied. When the applied tension is large, the spectrum begins to split into three parts (compare e.g. curve 202). The splitting of the spectrum will cause a slightly non-linear increment of the reflected power with the increase of tension, as will be described in more detail below with reference to FIG. 4.

It is noted here that the arrangement may be modified to a structure in which an asymmetric composite laminate structure "divides" the uniform FBG into two sections, e.g. by arranging the layers adjacent the FBG asymmetrically aligned around a centre of the FBG with no overlap between the layers. In such a modified arrangement, for a uniform grating with the same bandwidth, a splitting of the measured spectrum into two parts is expected at smaller displacements or strain values compared to the splitting into three parts for the sensor module 102 described above (FIGS. 1a and b).

Figure 3:
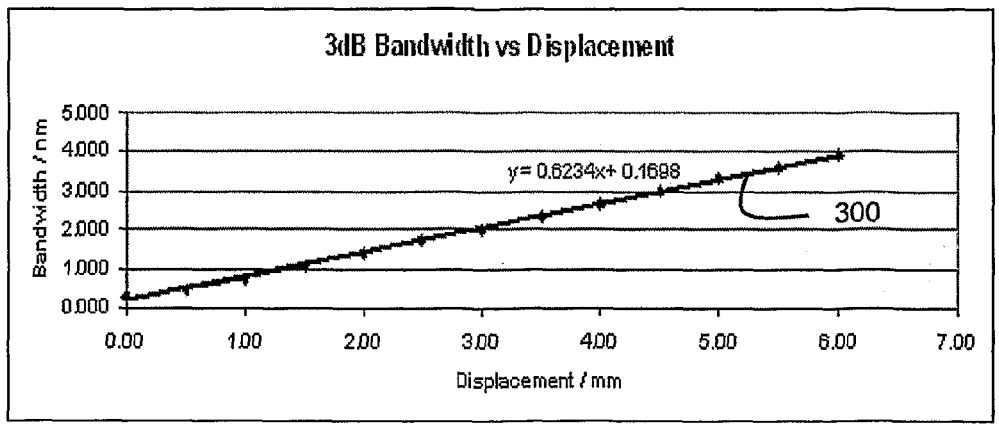
FIG. 3 shows a graph of bandwidth of the optical fiber strain sensor of FIGS. 1a and b as a function of displacements.

FIG. 3 shows the 3 dB bandwidth measured as a function of displacement. The 3 dB bandwidth of the FBG is increased linearly with the displacement (see curve 300).

Figure 4:
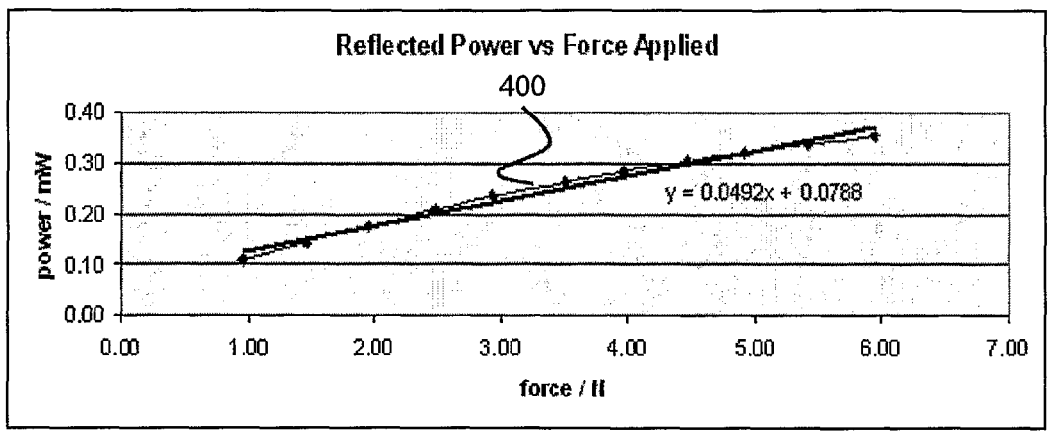
FIG. 4 shows a graph of reflected power of the optical fiber strain sensor of FIGS. 1a and b as a function of force applied.

FIG. 4 shows the reflected power as a function of force applied. The sensor module 102 (FIGS. 1a and b) is functioning as a tensile tester. The reflected power is monitored using a power meter. Curve 400 shows that the power is increased almost linearly with applied tension. The slight non-linearity is caused by the spectrum splitting discussed above with reference to FIG. 2. However, as the spectrum splitting is not a hysteresis loss during the cyclic load test, there still is a direct relationship between the reflected power and the applied force, and the sensor module can function as a tensile tester using simple calibration procedures.

Figure 5:
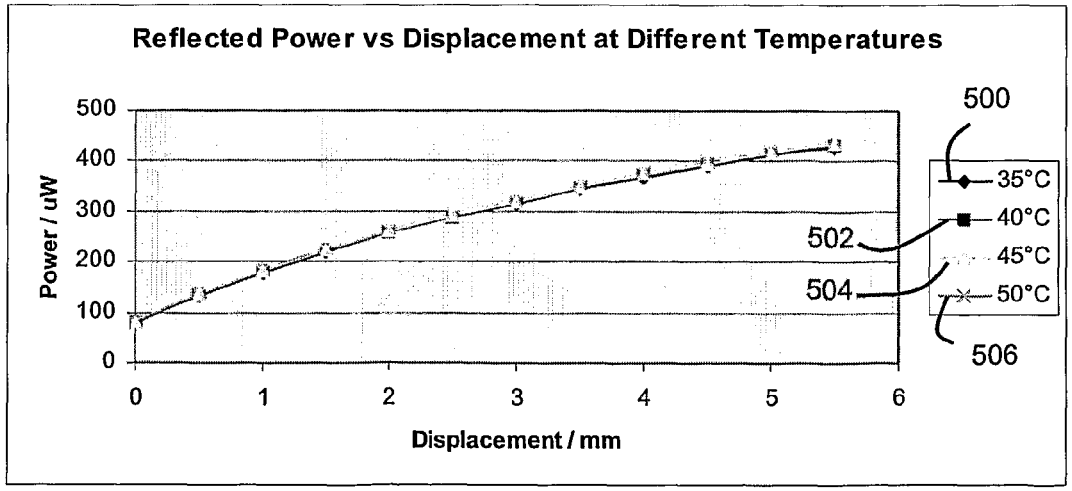
FIG. 5 shows a graph of reflected power of the optical fiber strain sensor of FIGS. 1a and b as a function of displacement at different temperatures.

In order to investigate the temperature independent nature of the sensor module 102 (FIGS. 1a and b), the sensor module is mounted into a micro-screw meter for adjusting a displacement of the laminate structure 100 (FIGS. 1a and b). The micro-screw meter with the sensor structure mounted therein is placed in an oven at different temperatures, for a series of different displacements at each temperature. FIG. 5 shows a plots of reflected power versus applied displacement, measured at 35, 40, 45 and 50° C. FIG. 5 illustrates that the sensor module is substantially temperature-independent since the reflected power varies little with temperature (compare curves 500, 502, 504 and 506), and can function as a temperature independent strain sensor.

Figure 6:
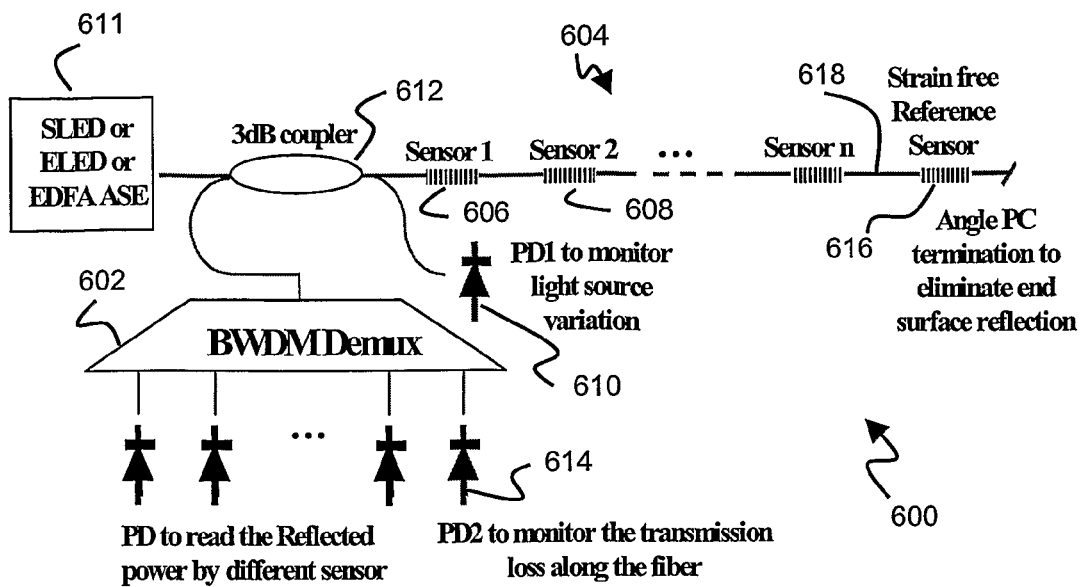
FIG. 6 is a schematic drawing of a multi-sensor arrangement.

FIG. 6 shows a schematic diagram of a multi-sensor arrangement 600 for simultaneous multi-sensor measurement. A bandpass wavelength division multiplexer 602 (BWDM) is used to separate the reflected power from an array 604 of gratings e.g. 606, 608 with different centre wavelengths. PD1 610 serves to eliminate the effect of the intensity variation due to power fluctuations in the light source 611. PD1 610 is coupled to one output of a 3 dB coupler 612 at the same side of the 3 dB as the array 604 of gratings.

The BWDM 602 is coupled to an output from the 3 dB coupler 612 at the same side as the light source 611. The light source 611 can e.g. be in the form of a superluminescent light emitting diode (SLED), an edge emitting LED (ELED), or an erbium doped fiber amplifier for amplified spontaneous emission (EDFA ASE). PD2 614 monitors the reflected power from a strain-free reference sensor 616 to eliminate errors caused by e.g. micro bending loss along the fiber 618. PD2 614 is coupled to the BWDM 602 according to the bandpass wavelength of the reference sensor 616. An angle prison coupler 620 is used to terminate the fiber 618 beyond the reference sensor 616, to eliminate any surface reflection. As will be appreciated by a person skilled in the art, the arrangement 600 can provide a lower complexity multi-sensor configuration for simultaneous multi-sensor measurement.

In the following, a fabrication process for forming a sensor module based on an asymmetric composite laminate structure will now be described. In order to increase the photosensitivity of a single mode fiber (SMF), an SMF-28 is soaked inside a high-pressure chamber with pure Hydrogen at 100 bars, 60° C. for two weeks. The fiber is then stored in a freezer at −20° C. to prevent the H2 from diffusing out from the fiber core.

Figure 7:
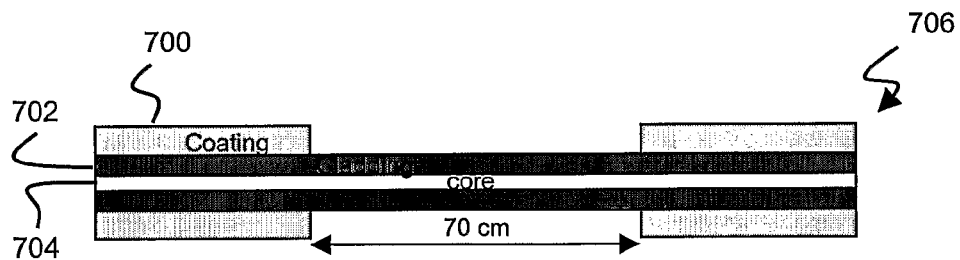
FIG. 7 shows a schematic cross-sectional view of an optical fiber for the strain sensor of FIGS. 1a and b.
Figure 8:
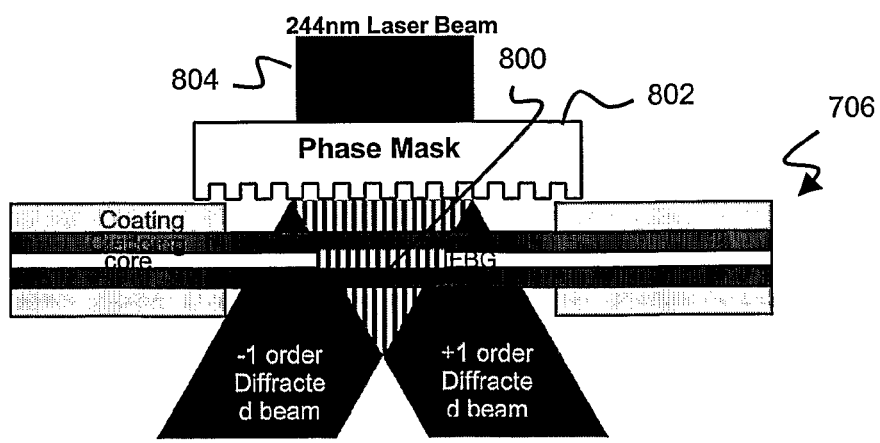
FIG. 8 shows a schematic cross-sectional view illustrating formation of an FBG in the optical fiber of FIG. 7.

With reference to FIG. 7, about 70 cm of the fiber coating 700 is striped by a mechanical stripper, leaving a cladding 702 and core 704 of the fiber 706 exposed. An about 60 mm FBG 800 is inscribed into the core 704 of the fiber 706 by an Argon-ion FBG fabrication system, utilizing a phase mask 802 and a 244 nm laser beam 804, as shown in FIG. 8. The FBG 800 is baked in an oven at 100° C. for 24 hours to stabilize the FBG's 800 centre wavelength.

Figure 9:
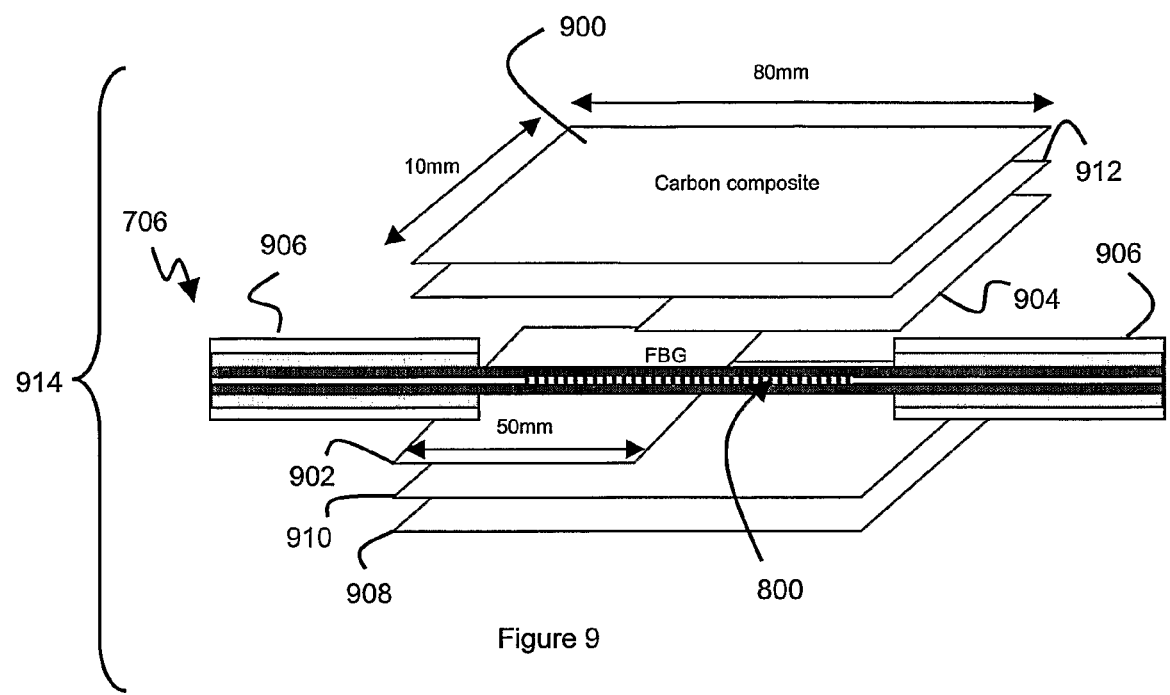
FIG. 9 shows an expanded perspective view, partly in cross-section, illustrating a packaging structure fabrication for the strain sensor of FIGS. 1a and b.

Fiber-reinforced carbon composite material (Fiberdux: 913C-XAS) is used as embedding material. With reference to FIG. 9, each carbon composite prepreg e.g. 900 is sandwiched between two non-adhesive films (not shown). Four pieces e.g. 900 of about 80 mm×10 mm and two pieces 902, 904 of about 50 mm×10 mm prepregs are utilised. A 900 μm protective sleeve 906 is used to protect the fiber 706 beyond the prepreg sheets e.g. 900.

The prepregs e.g. 900 are placed on an aluminum plate (not shown) ply by ply. A roller (not shown) is used to even out the surface between the plies, to ensure that there are no tiny air bubbles in between plies. The fiber 706 with the FBG 800 inscribed is embedded within the composite plies as shown in FIG. 9. More particularly, the non-adhesive film of prepreg 908 is removed and the prepreg 908 evened out by the roller. The non-adhesive film of prepreg 910 is removed and prepreg 910 is placed on top of prepreg 908 and then evened out by the roller. The non-adhesive film of prepreg 902 is removed and the prepreg 902 is placed on top of prepregs 908 and 910 and then evened out by the roller. The fiber 706 with FBG 800 together with the protective sleeves 906 are placed on top of prepregs 908, 910 and 902. The non-adhesive film of prepreg 904 is removed and the prepreg 904 is placed on top of the fiber 706 and then evened out by the roller. The non-adhesive film of prepregs 912 and 900 are removed and prepregs 912 and 900 placed on top of prepregs 908, 910, 902, 904 and then evened out by the roller.

The composite laminate structure 914 is sandwiched between two plates (not shown) which are tightened by screws at the sides and middle. Curing is the process whereby the prepregs e.g. 900, together with the grating fiber 706, are heated at an elevated pressure. The curing temperature is about 100° C. and the whole composite laminate structure is cured for about 80 minutes. During curing, the carbon fibers of the respective prepregs e.g. 900 react chemically with the neighboring fibers to produce a rigid cross-linked structure. This also enables the resulting FBG sensor to withstand a greater amount of pressure without breaking, compared to an un-embedded stripped optical fiber.

Figure 10:
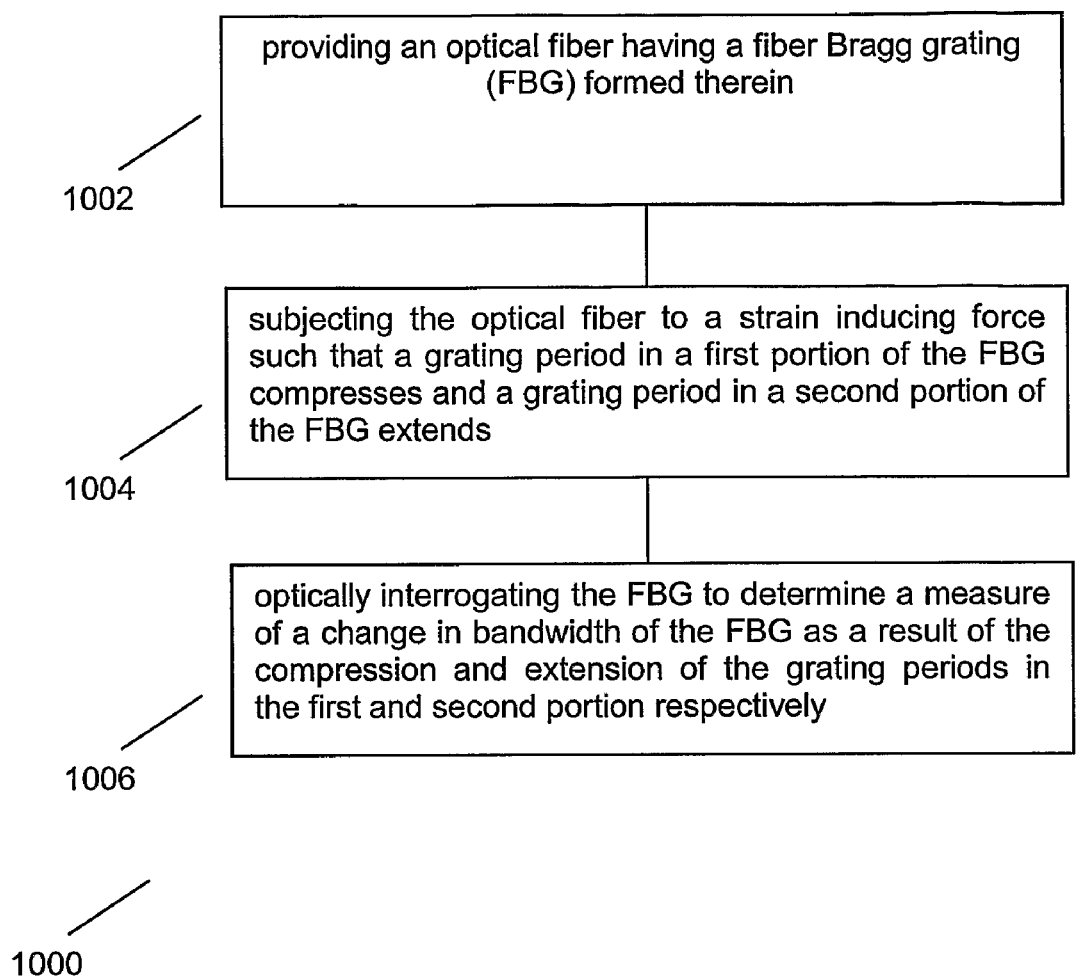
FIG. 10 shows a flowchart 1000 illustrating a method of strain sensing.

FIG. 10 shows a flowchart 1000 illustrating a method of strain sensing. At step 1002, an optical fiber having a fiber Bragg grating (FBG) formed therein is provided. At step 1004, the optical fiber is subjected to a strain inducing force such that a grating period in a first portion of the FBG compresses and a grating period in a second portion of the FBG extends. At step 1006, the FBG is optically interrogated to determine a measure of a change in bandwidth of the FBG as a result of the compression and extension of the grating periods in the first and second portion respectively; whereby the measure of the change in the bandwidth is representative of the strain induced.

Figure 11:
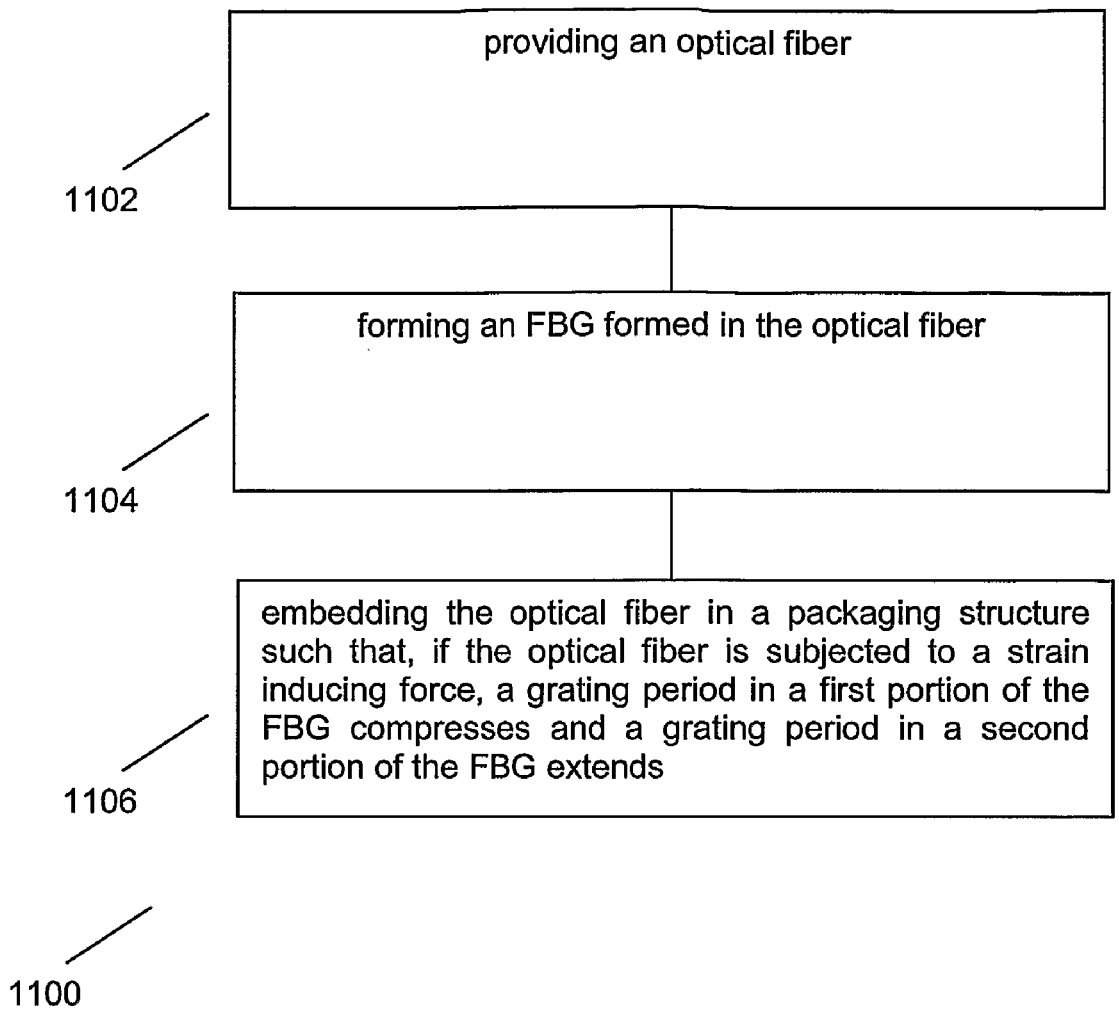
FIG. 11 shows a flowchart 1100 illustrating a method of fabricating an optical fiber strain sensor.

FIG. 11 shows a flowchart 1100 illustrating a method of fabricating an optical fiber strain sensor. At step 1102, an optical fiber is provided. At step 1104, an FBG is formed in the optical fiber. At step 1106, the optical fiber is embedded in a packaging structure such that, if the optical fiber is subjected to a strain inducing force, a grating period in a first portion of the FBG compresses and a grating period in a second portion of the FBG extends.

The invention claimed is:

1. A method of strain sensing comprising the steps of:
   providing an optical fiber having a fiber Bragg grating (FBG) formed therein;
   subjecting the optical fiber to a strain inducing force such that a grating period in a first portion of the FBG compresses and a grating period in a second portion of the FBG extends; and
   optically interrogating the FBG to determine a measure of a change in bandwidth of the FBG as a result of the compression and extension of the grating periods in the first and second portion respectively,
   whereby the measure of the change in the bandwidth is representative of the strain induced, and
   wherein the optical fiber is subjected to the strain inducing force such that a grating period in a third portion of the FBG remains unchanged.

2. The method as claimed in claim 1, wherein the FBG, in a quiescent state, has a uniform period across the first and second portions.

3. The method as claimed in claim 1, comprising providing an optical fiber having a plurality of FBGs formed therein and spaced apart along a length of the optical fiber;
   subjecting the optical fiber to a plurality of strain inducing forces such that, for each FBG, a grating period in a first portion of the FBG compresses and a grating period in a second portion of the FBG extends; and
   optically interrogating the FBGs to determine a measure of changes in bandwidth of the respective FBGs as a result of the compression and extension of the grating periods in the first and second portion respectively,
   whereby the measure of the changes in the bandwidth is representative of the strains induced.

4. The method as claimed in claim 1, comprising measuring a reflected optical power from the FGB as the measure for the change in the bandwidth.

5. An optical fiber strain sensor comprising:
   an optical fiber;
   an FBG formed in the optical fiber;
   a packaging structure embedding the optical fiber such that, if the optical fiber is subjected to a strain inducing force, a grating period in a first portion of the FBG compresses and a grating period in a second portion of the FBG extends; and
   an interrogation system coupled to the optical fiber for optically interrogating the FBG to determine a measure of a change in bandwidth of the FBG as a result of the compression and extension of the grating periods in the first and second portion respectively,
   whereby the measure of the change in the bandwidth is representative of the strain induced, and
   wherein the packaging structure embeds the optical fiber such that, if the optical fiber is subjected to the strain inducing force, a grating period in a third portion of the FBG remains unchanged.

6. The sensor as claimed in claim 5, wherein the FBG, in a quiescent state, has a uniform period across the first and second portions.

7. The sensor as claimed in claim 5, wherein the packaging structure comprises a composite laminate structure.

8. The sensor as claimed in claim 7, wherein the composite laminate structure comprises fiber-reinforced carbon composite material prepregs.

9. The sensor as claimed in claim 7, wherein the composite laminate structure is asymmetric with respect to the FBG.

10. The sensor as claimed in claim 5, wherein the optical fiber has a plurality of FBGs formed therein and spaced apart along a length of the optical fiber; and the packaging structure embeds the optical fiber such that, if the optical fiber is subjected to a plurality of strain inducing forces, for each FBG a grating period in a first portion of the FBG compresses and a grating period in a second portion of the FBG extends; and
    the interrogating system optically interrogates the FBGs to determine a measure of changes in bandwidth of the respective FBGs as a result of the compression and extension of the grating periods in the first and second portion respectively,
    whereby the measure of the changes in the bandwidth is representative of the strains induced.

11. The sensor as claimed in claim 5, further comprising a photo detector for measuring a reflected optical power from the FBG as the measure for the change in the bandwidth.

12. A method of fabricating an optical fiber strain sensor, the method comprising the steps of:
    providing an optical fiber;
    forming an FBG formed in the optical fiber;
    embedding the optical fiber in a packaging structure such that, if the optical fiber is subjected to a strain inducing force, a grating period in a first portion of the FBG compresses and a grating period in a second portion of the FBG extends,
    wherein the packaging structure embeds the optical fiber such that, if the optical fiber is subjected to the strain inducing force, a grating period in a third portion of the FBG remains unchanged.

13. The method as claimed in claim 12, further comprising coupling an interrogation system to the optical fiber for optically interrogating the FBG to determine a measure of a change in bandwidth of the FBG as a result of the compression and extension of the grating periods in the first and second portion respectively, whereby the measure of the change in the bandwidth is representative of the strain induced.

14. The method as claimed in claim 12 or 13, wherein the FBG, in a quiescent state, has a uniform period across the first and second portions.

15. The method as claimed in claim 12, wherein the packaging structure comprises a composite laminate structure.

16. The method as claimed in claim 15, wherein the composite laminate structure comprises fiber-reinforced carbon composite material prepregs.

17. The method as claimed in claim 15, wherein the composite laminate structure is asymmetric with respect to the FBG.

18. The method as claimed in claim 12, comprising forming a plurality of FBGs in the optical fiber and spaced apart along a length of the optical fiber; and embedding portions of the optical fiber in respective packaging structures such that, if the optical fiber is subjected to a plurality of strain inducing forces, for each FBG a grating period in a first portion of the FBG compresses and a grating period in a second portion of the FBG extends.

19. The method as claimed in claim 18, wherein the interrogating system optically interrogates the FBGs to determine a measure of changes in bandwidth of the respective FBGs as a result of the compression and extension of the grating periods in the first and second portion respectively; whereby the measure of the changes in the bandwidth is representative of the strains induced.

20. The method as claimed in claim 12, wherein the interrogation system comprises a photo detector for measuring a reflected optical power from the FBG as the measure for the change in the bandwidth.

21. A method of strain sensing comprising the steps of:
providing an optical fiber having a fiber Bragg grating (FBG) formed therein;
subjecting the optical fiber to a strain inducing force such that a grating period in a first portion of the FBG compresses and a grating period in a second portion of the FBG extends; and
optically interrogating the FBG to determine a measure of a change in bandwidth of the FBG as a result of the compression and extension of the grating periods in the first and second portion respectively,
whereby the measure of the change in the bandwidth is representative of the strain induced,
wherein the method further comprises the steps of:
providing an optical fiber having a plurality of FBGs formed therein and spaced apart along a length of the optical fiber;
subjecting the optical fiber to a plurality of strain inducing forces such that, for each FBG, a grating period in a first portion of the FBG compresses and a grating period in a second portion of the FBG extends; and
optically interrogating the FBGs to determine a measure of changes in bandwidth of the respective FBGs as a result of the compression and extension of the grating periods in the first and second portion respectively,
whereby the measure of the changes in the bandwidth is representative of the strains induced.

22. An optical fiber strain sensor comprising:
an optical fiber;
an FBG formed in the optical fiber;
a packaging structure embedding the optical fiber such that, if the optical fiber is subjected to a strain inducing force, a grating period in a first portion of the FBG compresses and a grating period in a second portion of the FBG extends; and
an interrogation system coupled to the optical fiber for optically interrogating the FBG to determine a measure of a change in bandwidth of the FBG as a result of the compression and extension of the grating periods in the first and second portion respectively,
whereby the measure of the change in the bandwidth is representative of the strain induced,
wherein the optical fiber has a plurality of FBGs formed therein and spaced apart along a length of the optical fiber; and the packaging structure embeds the optical fiber such that, if the optical fiber is subjected to a plurality of strain inducing forces, for each FBG a grating period in a first portion of the FBG compresses and a grating period in a second portion of the FBG extends, and
the interrogating system optically interrogates the FBGs to determine a measure of changes in bandwidth of the respective FBGs as a result of the compression and extension of the grating periods in the first and second portion respectively,
whereby the measure of the changes in the bandwidth is representative of the strains induced.

23. A method of fabricating an optical fiber strain sensor, the method comprising the steps of:
providing an optical fiber;
forming an FBG formed in the optical fiber;
embedding the optical fiber in a packaging structure such that, if the optical fiber is subjected to a strain inducing force, a grating period in a first portion of the FBG compresses and a grating period in a second portion of the FBG extends; and
forming a plurality of FBGs in the optical fiber and spaced apart along a length of the optical fiber; and embedding portions of the optical fiber in respective packaging structures such that, if the optical fiber is subjected to a plurality of strain inducing forces, for each FBG a grating period in a first portion of the FBG compresses and a grating period in a second portion of the FBG extends.

24. The method as claimed in claim 23, wherein the interrogating system optically interrogates the FBGs to determine a measure of changes in bandwidth of the respective FBGs as a result of the compression and extension of the grating periods in the first and second portion respectively, whereby the measure of the changes in the bandwidth is representative of the strains induced.

* * * * *